US006851053B1

(12) United States Patent
Liles et al.

(10) Patent No.: US 6,851,053 B1
(45) Date of Patent: Feb. 1, 2005

(54) MULTIPARTY CONFERENCE AUTHENTICATION

(75) Inventors: Jane R. Liles, Seattle, WA (US); Claus T. Giloi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,767

(22) Filed: Mar. 1, 2000

Related U.S. Application Data

(60) Provisional application No. 60/122,429, filed on Mar. 2, 1999.

(51) Int. Cl.$^7$ .............................................. H04L 9/00
(52) U.S. Cl. ...................... 713/168; 713/156; 709/229; 709/204; 370/261
(58) Field of Search ................................ 709/229, 204; 380/277; 370/261; 713/156, 168

(56) References Cited

U.S. PATENT DOCUMENTS

| | | | |
|---|---|---|---|
| 5,467,264 A | | 11/1995 | Rauch et al. |
| 5,471,318 A | | 11/1995 | Ahuja et al. |
| 5,530,795 A | | 6/1996 | Wan |
| 5,717,863 A | | 2/1998 | Adamson et al. |
| 5,717,879 A | | 2/1998 | Moran et al. |
| 5,812,534 A | | 9/1998 | Davis et al. |
| 5,864,711 A | | 1/1999 | Mairs et al. |
| 5,870,547 A | | 2/1999 | Pommier et al. |
| 5,874,960 A | | 2/1999 | Mairs et al. |
| 6,002,768 A | * | 12/1999 | Albanese et al. ........... 713/175 |
| 6,212,634 B1 | * | 4/2001 | Geer et al. .................. 713/156 |
| 6,215,872 B1 | * | 4/2001 | Van Oorschot .............. 380/30 |

FOREIGN PATENT DOCUMENTS

DE 38 18 087 12/1989

OTHER PUBLICATIONS

Microsoft, Netmeeting 3.0 Resource Kit, 1996–1999.*
Kanellopoulos, D.N. et al. "The Comprehensive Approach of QoS and the Evolution of ACSE Protocols in Multimedia Communications" *Electronics, Circuits and Systems,* 1996, Online! vol. 1, Oct. 13–16, 1996, pp. 323–326.
Onmori T et al. "Cooperative Control for Sharing Applications Based on Distributed Multiparty Desktop Conferencing System: Mermaid" *Proceedings of the International Conference on Communications,* US, NewYork, IEEE, vol.–, Jun. 14, 1992, pp. 1069–1075.
"Microsoft NetMeeting 3.0 Resource Kit," Microsoft Corporation, 1999.
R. Schaphorst, "Chapter 7: ITU–T Recommendation H.323 Packet–Based Multimedia Communications Systems," *Videoconferencing and Videotelephony: Technology and Standards,* Boston, Massachusetts, 1999.

(List continued on next page.)

*Primary Examiner*—Gregory Morse
*Assistant Examiner*—Jacob Lipman
(74) *Attorney, Agent, or Firm*—Leydig, Voit & Mayer, Ltd.

(57) ABSTRACT

A method and system for controlling admission of new nodes to a secured conference combines transport layer security mechanism and application layer certificate exchange. A new node that is not directly connected to the top provider of the conference sends a request to join the conference and a certification identifying itself to a first conference node connected to the top provider. The first node performs transport level authentication of the new node, and then forwards the request and certificate of the new node on an application level to the top provider. The top provider verifies the identity of the new node based on the certificate. If the new node is allowed to join the conference, the top provider updates a list of conference participants and makes the certificate of the new node available to other conference nodes so that they can also verify the identity of the new node.

23 Claims, 14 Drawing Sheets

OTHER PUBLICATIONS

"TAPI 3.0 and NetMeeting 2.0," *Microsoft Developer's Network CD,* Microsoft Corporation, Mar. 30, 1999.

R. Schaphorst, "Chapter 10: Multipoint Graphic Communications (T.120)," *Videoconferencing and Videotelephony: Technology and Standards,* Boston, Massachusetts, 1999.

"Understanding Proxy Server," *Microsoft Developer's Network CD,* Microsoft Corporation, 1998.

"Video Conference Program Allows More Private Face–To–Face Time," Chicago Tribune, May 24, 1999.

"Exchanging Session Keys," *Microsoft Developer's Network CD,* Microsoft Corporation, 1999.

"Chapter 4 Firewall Configuration," *Microsoft Developer's Network CD,* Microsoft Corporation, Apr. 30, 1998.

"Chapter 6 Troubleshooting," *Microsoft Developer's Network CD,* Microsoft Corporation, Apr. 30, 1998.

"Chapter 7 NetMeeting Architecture," *Microsoft Developer's Network CD,* Microsoft Corporation, Apr. 30, 1998.

"Chapter 8 Conferencing Standards," *Microsoft Developer's Network CD,* Microsoft Corporation, Apr. 30, 1998.

"Chapter 9 Product Interoperability," *Microsoft Developer's Network CD,* Microsoft Corporation, Apr. 30, 1998.

A. Krassel et al., "Microsoft's NetMeeting 2.1 COM Interfaces: Understanding How They Work," Microsoft Corporation, [web page], Apr. 10, 1998. http://www.msdn.microsoft.com/workshop/messaging/netmtg/netmtgcom.asp. [Accessed May 18, 1999].

"Text Figures," Microsoft Corporation, [web page], 1999. http://www.microsoft.com/mind/0199/netmeeting/netmeetingtextfigs.htm [Accessed May 18, 1999].

Microsoft Corporation, "How to Establish NetMeeting Connections Through a Firewall," [web page], revised Oct. 23, 1998. http://support.microsoft.com/support/kb/ARTICLES/Q158/6/23.asp [Accessed May 18, 1999].

Microsoft Corporation, "How to Create a NetMeeting Hyperlink on a Web Page," [web page], revised Oct. 22, 1998. http://support.microsoft.com/support/kb/ARTICLES/Q157/2/77.asp. [Accessed May 18, 1999].

Microsoft Corporation, "How to Share Programs with NetMeeting," [web page], revised Oct. 27, 1998. http://support.microsoft.com/support/kb/ARTICLES/Q154/3/54.asp. [Accessed May 18, 1999].

Microsoft Corporation, "How to Make a Video Call with NetMeeting," [web page], revised Oct. 27, 1998. http://support.microsoft.com/support/kb/ARTICLES/Q167/7/78.asp. [Accessed May 18, 1999].

Microsoft Corporation, "How to Start NetMeeting Conference from a Command Line," [web page], revised Oct. 27, 1998. http://support.microsoft.com/support/kb/ARTICLES/Q167/0/97.asp. [Accessed May 18, 1999].

Microsoft Corporation, "How to Use Whiteboard in Microsoft NetMeeting," [web page], revised Oct. 27, 1998. http://support.microsoft.com/support/kb/ARTICLES/Q154/3/10.asp. [Accessed May 18, 1999].

White Pine, "CU–SeeMe Pro Will Improve Communication and Collaboration," [web page], 1999. http://www.upine.com/Products/CU–SeeMe–Pro/cu–pro–business–features.html. [Accessed May 19, 1999].

White Pine, "All New CU–SeeMe Pro–Changing the Face of Communication!," [web page], 1999. http://www.upine.com/Products/CU–SeeMe–Pro/index.html. [Accessed May 19, 1999].

DataBeam, "DataBeam Meeting Tools!," [web page], 1999. http://www.databeam,com.meetingtools/info.html. [Accessed May 19, 1999].

IMTC, "IMTC Search: H.245," [web page], 1999. http://www.imtc.org/cgi–bin/query.cgi. [Accessed May 11, 1999].

IMTC, "H.323 Overview," [web page], 1999. http://www.imtc.org/h323body.htm. [Accessed May 11, 1999].

IMTC, "Frequently Asked Questions," [web page], 1999. http://www.imtc.org/faqbody.htm. [Accessed May 11, 1999].

IMTC, "H.320 Overview," [web page], 1999. http://www.imtc.org./t120body.htm. [Accessed Jun. 17, 1999].

"NetMeeting 3 Beta," [web page], Updated Mar. 23, 1998. http://www.microsoft.com/netmeeting/Beta39.htm. [Accessed May 7, 1999].

A. Krassel et al., "Microsoft NetMeeting 2.1 COM Interfaces: Understanding How They Work," [web page], Microsoft Corporation, Apr. 10, 1998. http://msdn.microsoft.com/library/techart/msdn_netmtgcom.htm. [Accessed May 4, 1999].

Don Anderson, "Overview of the IEEE 1394 Architecture," *FireWire System Architecture: 2nd Edition,* MindShare, Inc., Addison–Wesley: Reading, Massachusetts, pp. 19–34, (1999).

"Secure Networking Using Microsoft Windows NT 5.0 Distributed Security Services," *Microsoft Developer's Network CD,* Microsoft Corporation, 1999.

Microsoft Corporation, "Microsoft Certificate Server," [web page], Apr. 17, 1997. http://msdn.microsoft.com/workshop/security/client/certsvr.asp. [Accessed May 20, 1999].

Microsoft Corporation, "Windows NT E3/F–C2 Evaluations," [web page], Apr. 28, 1999. http://www.microsoft.com/security/issues/e3fc2summary.asp. [Accessed May 4, 2000].

Microsoft Corporation, "Secure Sockets Layer/Transport Layer Security," [web page], Oct. 8, 1998. http://www.microsoft.com/security/tech/ss1/default.asp. [Accessed May 21, 1999].

Microsoft Corporation, "How to Parse a Certificate Using Active Server Pages (ASP)," [web page], Updated Dec. 1996. http://msdn.microsoft.com/workshop/security/client/parse.asp. [Accessed May 20, 1999].

Microsoft Corporation, "Securing Data Transmissions with Secure Sockets Layer (SSL)," [web page], Updated Dec. 1996. http://msdn.microsoft.com/workshop/security/client/iis_ss1.asp. [Accessed May 20, 1999].

Netscape Communications Corporation, "How SSL Works," [web page], 1999. http://developer.netscape.com/tech/security/ss1/howitworks.html. [Accessed Nov. 16, 1999].

VeriSign, Inc., "Encryption and Digital Certificates," [web page], 1999. http://www.verisign.com/whitepaper/enterprise/overview/page2.html. [Accessed Nov. 16, 1999].

Netscape, "How Digital Certificates Work," [web page], 1999. http://www.netscape.com/security/techbriefs/certificates/howcerts.html[. (Accessed Nov. 16, 1999].

Netscape Communications Corporation, "Enterprise–Ready, Open Standards–Based Email Security," [web page], 1999. http://developer.netscape.com/tech/security/email/smime.html. [Accessed Nov. 16, 1999].

Netscape, "How Personal Certificates Work," [web page], 1999. http://www.netscape.com/security/techbriefs/personalcerts/how.html. [Accessed Nov. 16, 1999].

Netscape, "Personal Certificates," [web page], 1999. http://www.netscape.com/security/techbriefs/personalcerts/index.html. [Accessed Nov. 16, 1999].

Keith Brown, "Security Briefs," *Microsoft Developer's Network CD*, Microsoft Corporation, Feb. 1999.

"PFX: Personal Information Exchange Syntax and Protocol Standard," *Microsoft Developer's Network CD*, Microsoft Corporation, Jan. 27, 1997.

J. Benaloh et al., "The Private Communication Technology (PCT) Protocol," *Microsoft Developer's Network CD*, Internet Draft, Microsoft Corporation, Oct. 1995.

"What's New in the NetMeeting Resource Kit Wizard," *Microsoft Developer's Network CD: Microsoft NetMeeting*, Microsoft Corporation, Apr. 1999.

"First–Time Users," *Microsoft Developer's Network CD: Microsoft NetMeeting*, Microsoft Corporation, Apr. 1999.

"Before the Meeting Starts," *Microsoft Developer's Network CD: Microsoft NetMeeting*, Microsoft Corporation, Apr. 1999.

"During the Meeting," *Microsoft Developer's Network CD: Microsoft NetMeeting*, Microsoft Corporation, Apr. 1999.

"Troubleshooting Tips," *Microsoft Developer's Network CD: Microsoft NetMeeting*, Microsoft Corporation, Apr. 1999.

"Glossary," *Microsoft Developer's Network CD: Microsoft NetMeeting*, Microsoft Corporation, Apr. 1999.

"NetMeeting 2.1 Features," [web page], Microsoft Corporation, Update Jan. 5, 1998. http://www.microsoft.com/netmeeting/features/main.htm. [Accessed May 4, 1999].

Microsoft Corporation, "Microsoft NetMeeting 2.0: Overview and Frequently Asked Questions," [web page], Updated Jul. 15, 1997. http://msdn.microsoft.com/library/backgrnd/html/msdn_netmofaq.htm. [Accessed May 4, 1999].

"Microsoft NetMeeting 3.0 Resource Kit," Microsoft Corporation, 1999.

DataBeam, "A Primer on the T.120 Series Standard," [web page], 1999. http://www.databeam.com/ccts/t120primer..html. [Accessed May 4, 1999].

* cited by examiner

MULTIPARTY CONFERENCE AUTHENTICATION

CROSS-REFERENCES TO RELATED REFERENCES

This application claims priority from the U.S. Provisional Application No. 60/122,428 filed on Mar. 2, 1999.

TECHNICAL FIELD

This invention relates generally to facilitating video/audio and data conferencing and, more particularly, relates to setting up and managing conferences with encryption and security features added to generate flexible user and web friendly topologies.

BACKGROUND OF THE INVENTION

The phenomenal growth of electronic commerce has resulted in a multitude of new applications, including the hosting, conducting and managing of remote conferences. The ability to conference with other individuals makes consultations prompt, with less travel and superior interactive experience resulting in better decision-making. Typically, conferencing includes not mere audio and video connections, but also the ability to work on documents and projects, share applications, and post stuff on blackboards and communicate via email. These latter modes of conferencing require data transfer as opposed to a stream of video and audio signals. Many software packages, including "NETMEETING™" by "MICROSOFT®" are being marketed and continuously improved to meet this growing and maturing market.

A number of standards have been developed to facilitate interoperability and efficiency between different types of operating systems, platforms, and applications that may be connected to the Internet or Intranets. The conferencing standards may be thought of as representing two rather different approaches. On one hand there are conferencing connections made by direct interactions with known parties with a centralized control of the conference. On the other hand there is a decentralized conferencing ability with connections made via, potentially, unknown intermediaries. The widely used H.323 suite of standards is quickly becoming the preferred standard for video and audio conferencing and represents decentralized conferencing. In contrast, exchange of data, as opposed to audio/video signals, is usually conducted in compliance with the T.120 set of standards which have a centralized control.

These two standards differ in the Quality of Service (QoS) in so far that H.323 utilizes "best attempt" assurances in facilitating packet based audio/video communications while T.120 uses the "error free" guarantees. There are further differences between the standards exemplified in the possible conference topologies, set up, and management of conferences. In particular, H.323 recognizes and uses 'Gatekeepers', 'Gateways' and permits implementation of a Multipoint Control Unit (MCU) in two modules, viz., a Multipoint Controller (MC) and a Multipoint Processor (MP). T.120, on the other hand, uses a Multipoint Communication Service (MCS) and Generic Conference Control (GCC) to implement conference topologies and communication flow, including provisions for channels that may be set up and torn down during a conference.

T.120 allows for conferences with a defined "Top Provider" (TP) node. Topologies compatible with a TP include trees, cascades, linear chains, star and their combinations. In contrast, H.323 envisages only a star topology, in which a conference host connects to a number of conference participants. In the case of T.120, the requirement for one TP means that two conferences cannot be connected together. In other words, for a node participating in a T.120 compliant conference it is not possible to participate in another T.120 compliant conference because there is only one possible TP. In addition, T.120 allows for a TP with the final say on who joins a conference in progress, thus providing another tunable screen.

The flow of information may be visualized by viewing a T.120 conference as a number of domains defined by upward connectivity to the TP or a MCS node. This information flow, under MCS includes use of channels to send messages to all or a subset of participants in a T.120 conference. It is worth noting that a node in a T.120 conference may send data on only one channel at a time, but may receive data from several channels.

Despite the obvious capabilities provided in the current conferencing products, many problems remain. Although adoption of packet based H.323 standards allowed conferencing to be easily implemented beyond local area network (LAN) environments, increased use of long distance communications using wide area networks (WAN) and the Internet requires that serious attention be paid to security issues. Many of the problems remain in the implementation of secure conferences in advantageously utilizing the advanced encryption/authentication schemes or flexible conference topologies. Flexible conference topologies and security concerns present new challenges since the Internet includes networks with varied accessibility due to the presence of firewalls, proxies and other intermediaries that may not be secure and/or seek to examine data.

Furthermore, limiting geographical or topological reach of conferencing is not desirable. For instance, a star topology for a H.323 conference allows for authentication of every participant in the conference, but is limiting in the topology and security. On the other hand, a T.120 conference cannot exchange video/audio signals while being able to send data over a broad range of topologies that admit of a TP. An additional limitation in T.120 conferences is that the TP has to approve the entry of a node to the conference. However, the TP cannot independently authenticate the identity of a new node since the authentication/encryption protocol is at a lower layer, and, typically, carried out between the node directly negotiating with the potential entrant. Typically, managing secure linkages is transparent to the application layer and even more inaccessible to other conference nodes. In other words the TP, and in case of other communications, the rest of the conference nodes, have to trust the negotiating node.

T.120 conferences differ from H.323 compliant conferences in not being cognizant of proxies, gateways and gatekeepers, thus being limited to direct negotiations with nodes. Adoption of the H.323 standards with interoperability with T.120 standards makes possible limited negotiations with a distant node with intervening proxies. Consequently, secure data conferences remain limited to direct connections between conference participants whose identities can be established and are available as participating nodes in the conference.

SUMMARY OF THE INVENTION

The invention described herein overcomes these limitations and provides means for establishing a multitude of topologies, using proxies, gateways, and gatekeepers and other intermediaries. In particular, implementation of dynamic secure conferencing setups by combining protocols designed for either centralized conference control or decentralized conference control is described. Thus, the invention provides a framework to combine H.323 compliant conferences, including secure conferences, to create T.120 compliant topologies with H.323 dependent secure connections, including connections that span firewalls. Combining H.323 compliant conferences is possible because in the absence of a TP, the H.323 setup facilities can be used in accordance with the invention to access nodes unavailable to T.120 compliant conferences.

In particular, conferences are described where conference participants can reliably learn of the identity of a potential new entrant to the conference prior to the new entrant actually joining the conference. This is significant since the impersonal nature of electronic communications makes masquerading particularly easy. The use of authentication procedures to confirm a party's claimed identity restricts transactions to reliably known parties in secure conferences. Further applications of the invention include integration of proxies, gatekeepers and gateways with T.120 standards to extend the reach of T.120 compliant secure conferences, making possible complex addressing protocols and dynamic topologies with potential reduction of network traffic.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
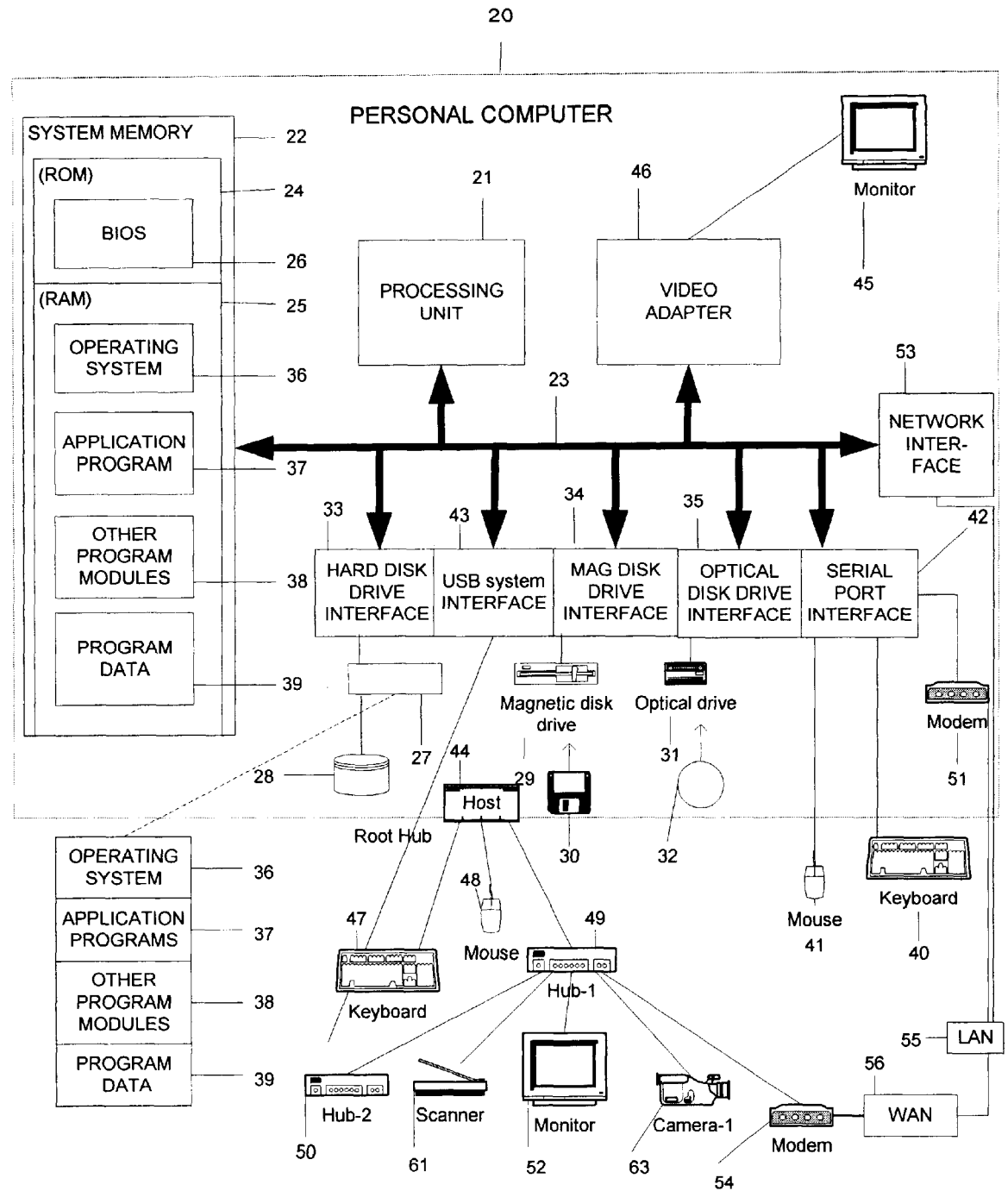
FIG. 1 is a block diagram generally illustrating an exemplary computer system on which the present invention resides.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Other interfaces that may be used include parallel ports, game ports, and the FireWire® specification. A monitor 45 or other type of display device is also connected to the system bus 23 via an interface, such as a video adapter 46. In addition to the monitor, personal computers typically include other peripheral output devices.

The USB connections, which also represent use of rapidly maturing standards such as the IEEE 1394 serial bus, illustrate extensions to the familiar desktop. A keyboard 47, a pointing device 48 and another hub, hub-1 49, are connected to the root hub/Host 44. Hub-1 49 is further connected to another hub, hub-2, 50, scanner 61, monitor 52, camera-1 63, and modem 54. It should be understood that additional cameras and devices may be directly connected to the computer instead of a USB. Thus, the system depicted is capable of communicating with a network and sending/receiving audio, video and data.

The personal computer (PC) 20 may operate in a networked environment using logical connections to one or more remote computers. The remote computer may be another personal computer, a server, a router, a network PC, a peer device or other common network node, and typically includes many or all of the elements described above relative to the PC 20 in FIG. 1. The logical connections depicted in FIG. 1 include a local area network (LAN) 55 and a wide area network (WAN) 56. Such networking environments are commonplace in offices, enterprise-wide computer networks, intranets and the Internet and are intended to include computing environments implemented as networks of devices.

When used in a LAN networking environment, the PC 20 is connected to the local network 55 through a network interface or adapter 53. When used in a WAN networking environment, the PC 20 typically includes a modem 51 and/or modem 54 or other means for establishing communications over the WAN 56. Modem 51, which may be internal or external, is connected to the system bus 23. It will be appreciated that the network connections shown are exemplary and other means of establishing a communications link between the computers may be used.

In a conferencing context, the first issue that arises is that of negotiating and initiating connections with a distant node. In the freewheeling cyberworld it is not uncommon to have targets that are thousands of miles away with unknown addresses, or worse—dynamic addresses. In addition there is no dearth of people pretending to be someone else, or tapping into other peoples conversations uninvited.

Not surprisingly, these concerns are reflected in the protocols used to setup and manage conferences over computer networks. There are protocols that prefer direct interaction with known nodes and with the possibility of providing secure encrypted data linkages. An example would be the suite of T.120 standards. For conferences that span greater extents of the network but with less need for security some protocols permit negotiations across proxies and routers for audio and video enabled connections that provide limited authentication due to the possibility of actually viewing or hearing the other party. An example is provided by the H.323 standards.

Conferencing needs also differ based on the quality of information that needs to be exchanged. Thus, while data transmissions are sensitive to errors, and may be transmitted at a slower rate, audio and video connections demand speed while being error tolerant. Similarly, data transmissions need more security since it is more important that email communications, shared applications and the like be secure. Audio and video communications often can do without the processing overhead required for ensuring security since it is speed that really compromises the audio/video experience due to choppy sound and motion resulting from faltering transmission speed.

In a secure conference, even with encryption, it is of significance whether the communications are secure, particularly at an intermediate node. This issue does not arise in communications over direct connections, but is of no little significance when there are intermediate computers by necessity. And the reach of a conference is closely related to the topologies that may be supported as individuals join or leave the conference.

In brief, two sets of protocols maybe identified for conducting and managing conferences over the computer networks. The first set of protocols may be described as governing direct connections with centralized management while the other set may be described as flexible and decentralized. Both offer benefits in the context of setting up and managing secure conferences. As is described below, it is possible to user the two protocols together to enjoy the advantages from both while retaining transparency from the perspective of the user.

In secure conferences it is useful to designate a host who is responsible for security, admission criteria, tracking participants, and, possibly communications. In addition, it would be desirable that the conference be compatible with a variety of computer systems and networking protocols. The widely used T.120 specifications permit conferences to be setup between clearly identified participants. A master host, termed the Top Provider (TP), maintains a dynamically updated database of participants in the conference as part of the Generic Conference Control (GCC). This database permits a view of the current participants in the conference. Naturally, the use of proxies is usually not possible. A proxy, in this context, is a computer that presents itself as another computer by simulating the requisite responses. It should be also noted that in some embodiments a T.120 conference may be able to use a proxy intermediate since addressing a target of interest may result in the proxy responding in a manner indistinguishable from the target. However, such embodiments are often significantly less secure as a consequence.

In contrast, the H.323 standards allow connections to be negotiated over intermediate computers, possibly unknown, and conferencing is not restricted by a master host. Since the path taken to access a distant node may be different at different times, the ability to connect via transparent intermediaries is a great advantage. H.323 standards allow integration of strategies to lookup addresses in dynamic tables, thus placing the Internet within the reach of conferencing. As described next, it is possible to combine the abilities of these contrasting conferencing strategies to make possible a superior conferencing implementation.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware or more than one software module.

An embodiment of many aspects of the invention described herein is the "NETMEETING" brand conferencing software package, versions 3.0 and above, manufactured by "MICROSOFT" Corporation of Redmond, Wash. Features and many additional uses of the invention will become clear in the following description of some of the embodiments.

Figure 2:
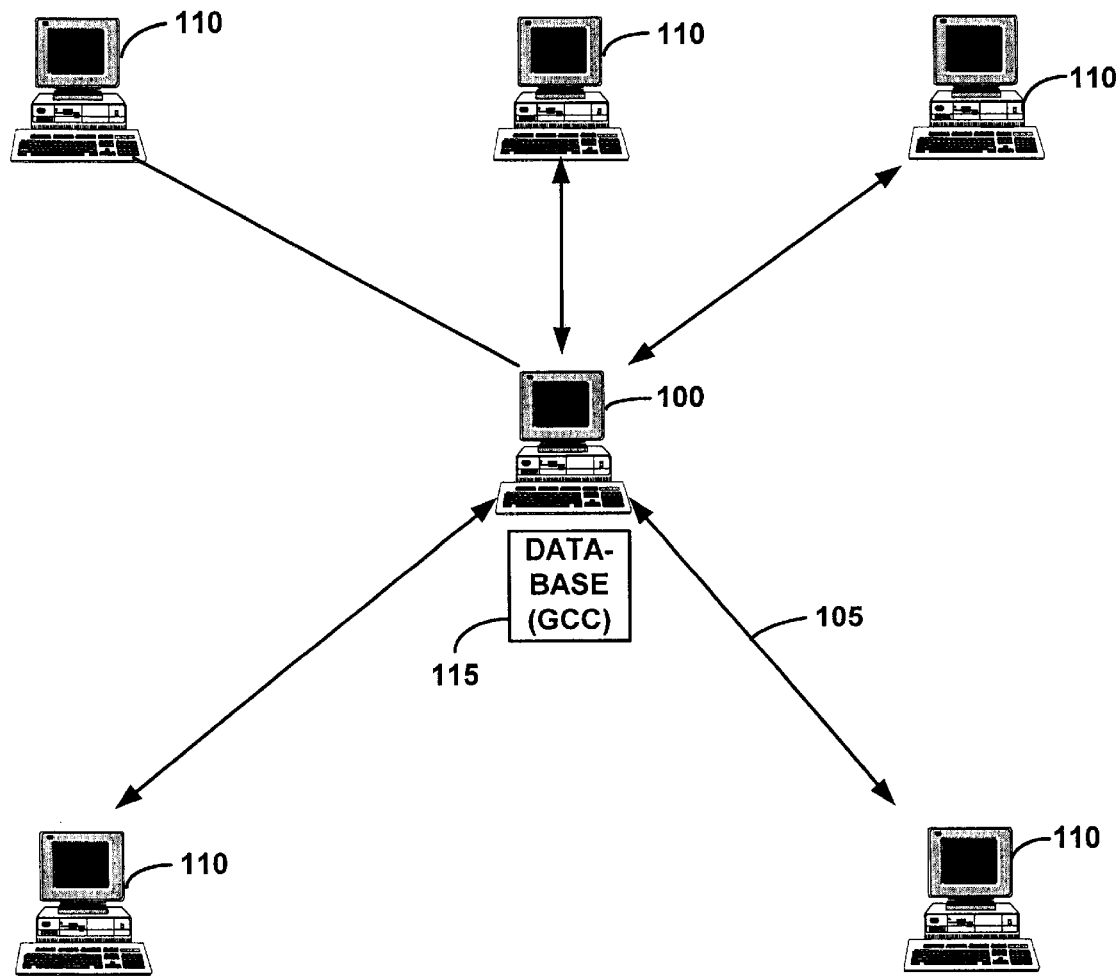
FIG. 2 illustrates a star topology for a conference.

FIG. 2 illustrates an exemplary T.120 compliant conference with a star topology. The top provider (TP) 100 is connected by a bidirectional link 105 to a conference participant 110. In this case, the conference participant is a node at which the conference ends. TP 100 maintains a database 115 containing the information about the applications supported in the conference and a list of the conference participants, although, it does not include necessarily information about the conference topology.

Figure 3:
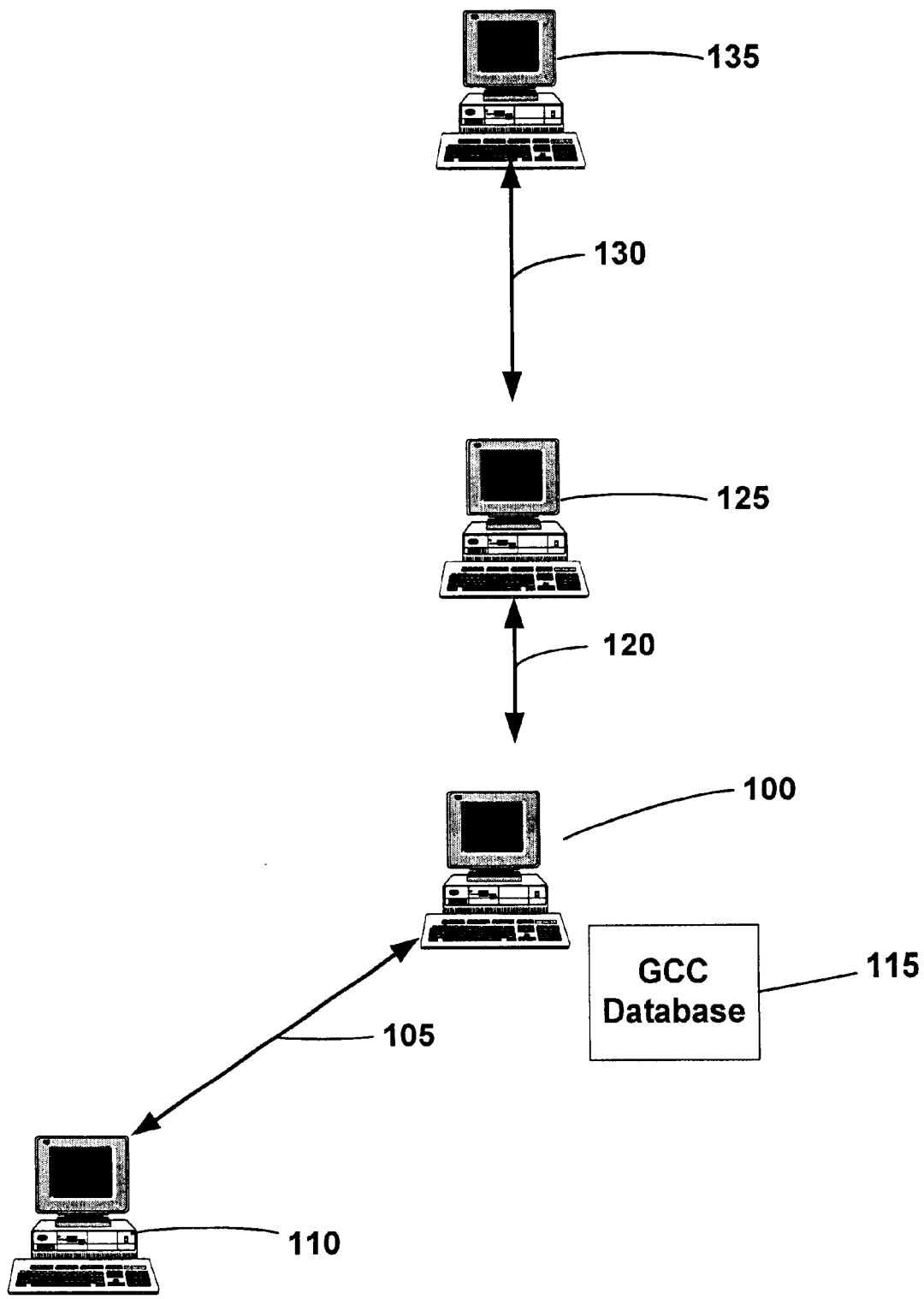
FIG. 3 illustrates a daisy-chain conference topology.
Figure 4:
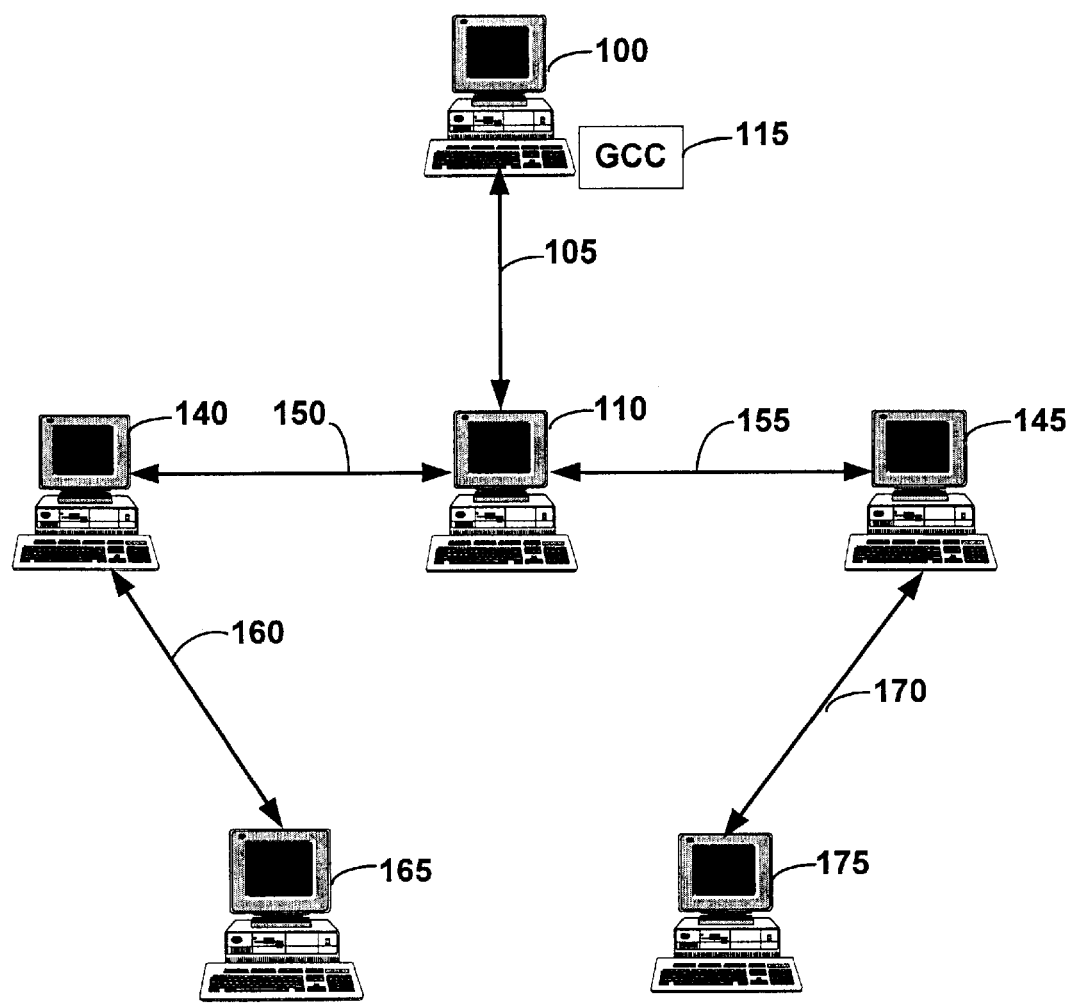
FIG. 4 illustrates a cascaded topology for a conference.

FIG. 3 illustrates a T.120 compliant conference with a daisy chain topology. The TP 100 is connected, via a bi-directional link 105, to a conference participant 110. Another bi-directional link 120 connects TP 100 to a second conference participant 125, who in turn is connected via link 130 to conference participant 135. Participant 135 can stay in the conference only if participant 125 remains in the conference. Furthermore, participant 135 joined the conference by communicating with participant 125 and subject to approval by TP 100. FIG. 4 illustrates a T.120 compliant conference with a cascade topology, which is similar in its organization and operation to the star and daisy chain topologies.

Conference participant 125 is an essential link between conference participant 135 and TP 100. All participants implement procedures to release resources if an upstream node in the conference should exit the conference. The T.120 calling procedures limit the reach of T.120 compliant conferences because a distant participant, i.e., more than one hop away, can be included in the conference only if the intermediate hops are also conference nodes.

Turning to software, it should be noted that software often conforms to a layered model where each layer operates on the data prior to passing it to the next layer. An example is the familiar seven layer Open System I (OSI) model. Usually in such software organizing schemes the lower layers handle details such as signal detection, synchronizing signals, making/breaking packets, error detection/correction, and, if necessary, encryption or decryption of data. Thus, the higher layers, including conferencing applications, may well be unaware of the processing in the lower layers prior to receiving or actually sending data.

Widely used authentication procedures are defined to function on a bilateral basis, and are handled at a lower level than T.120 (or H.323) procedures. As a consequence, a TP 100, in general, cannot independently authenticate the identity of the new distant potential conference participant. Often no communication to upper layers takes place if the security requirements are not fulfilled. And, once communications are possible the new node has already passed the authentication tests. TP 100 is often far removed from a node actually communicating with a potential new entrant thus making independent authentication by TP 100 difficult since all of the relevant information has to be encrypted and transmitted upstream to TP 100. The process has to be repeated to communicate the decision of the TP 100.

In an authentication/encryption scheme, the first hurdle to be passed upon placing a call is having one or both parties provide proof of their identity, usually by means of a certificate issued by a trusted source. In the context of a secure conference, usually a party seeking to join the secure conference has to prove its claimed identity. Although, it is possible, in some embodiments, that a conference-node may be required to prove its identity. Even more interestingly, the conference as a whole may choose to acquire an identity and may elect to present such group identification, not unlike flashing a Police or FBI badge. In such an instance, the conference may choose to acquire such an identifier with a set of keys, which are discussed below. The essential element is that a certificate contains information about a party presenting the certificate so that any alterations, including those by the party presenting the information, can be detected as is actually realizable by modem encryption/decryption algorithms.

The basic procedure may be understood by considering the asymmetric key encryption scheme. In this scheme there are two keys that may be used in the encryption/decryption procedure, conveniently termed the public key and the private key. The private key is held securely, e.g., stored in a safe location in the memory of a computer. The public key is given out freely. The public and private keys are mathematically related, but not computable easily from each other. In particular, knowledge of the public key does not allow computation of the private key in a reasonable time. Furthermore, a message may be encrypted with one of the keys but can be decrypted only with the other key. With these two important properties of the functions/algorithms used to implement encryption/decryption, digital certificates, certificates and many other useful applications are possible.

A potential-new-node seeking admission to the conference may request a trusted certificate authority (CA) to issue a certificate about its identity. This request is preferably coded with the CA's public key. There are many ways to achieve this goal including; for instance, first encrypting the claimed identity with the potential-new-node's private key and then encrypting the message along with a copy of the potential-new-node's public key using CA's public key. This ensures that CA will know which public key to use for further decryption once it decrypts the message with its own private key. Furthermore, successful decryption of the message assures the CA that the message actually originated with the potential-new-node since it had to be encoded by the potential-new-node's private key to permit decryption by the potential-new-node's public key. Thus, a CA, particularly one that issued the potential-new-node's private key, can check a database to verify the claimed identity.

CA now encrypts information about the identity of the potential-new-node and, for instance the public key corresponding to the private key of the potential-new-node using its own private key to form the authenticating certificate, possibly with a digital signature. When this authenticating certificate is presented to another node, such as a conference node, the conference node can decrypt the information using the CA's public key. The conference node will know that the authentication certificate is being presented by the genuine party by decoding a message using the potential-new-node's public key, which is now certified by the CA.

It is important to note that while the potential-new-node can read the information certified by the CA, it cannot alter it without being detected since it does not know CA's private key. Furthermore, CA may attach an encrypted one way hash of the message so that a recipient can further gain confidence that the entire message is authentic even if it is received in smaller parts. A one way hashing function is often chosen so that the output is of the same size regardless of the size of the input. The probability of successfully altering the message while retaining the same hashing result is a seriously non-trivial undertaking thus further attesting to the authenticity of the attached message. In other words, these messages can be read by many people since the decoding key is a public key, but they cannot be altered without the altered state being flagged due to the unknown private key used to create the message and the hashing signature. In addition, such an authenticating certificate and the associated keys may be provided with a finite lifetime thus making tampering and reverse engineering difficult.

The description provided of a possible authentication procedure is for illustrative purposes and is not intended to be limiting. There are many schemes available for exchanging keys, signing documents and attaching certificates to documents that allow the attached document to be verified to be free of alterations. A scheme for authentication/encryption negotiations is provided by the SECURE SOCKET LAYER (SSL), versions 1.0 and 2.0. Another scheme that is compatible with, and a possible improvement over SSL, is the Private Communication Technology (PCT) being considered by the Internet Engineering Task Force (IETF). PCT differs from SSL primarily in its handshaking protocol. All security protocols require a procedure for establishing a secure encrypted channel such that both speed and reliability of communications is optimized while exchanging information over public networks.

It is preferable to use asymmetric keys to exchange symmetric keys to allow faster encryption/decryption. Embodiments using symmetric keys may be devised that also permit authentication, albeit with different protocols. Many combinations of these techniques may be used to realize secure conferencing connections. Preferably, software implementations make certificate acquisition, certificate verification, key exchange, key generation and encryption/decryption, including breaking messages into blocks and other details transparent to the user.

Following authentication, parties may exchange or recognize keys to be used in subsequent communications. These keys are often valid only in a bilateral context. Thus, sending a message over link 120 may use one set of keys and subsequent transmission over link 130 may involve another set of keys. At each node, in such a setup, information needs to be decrypted and re-encrypted, preferably carried out by the lower layers in a manner transparent to the upper layers. Thus, when TP 100 receives a request by a potential new-entrant-to-the-conference more than a hop away, TP 100 may not know the actual identity of the new entrant. TP 100 will recognize that the new entrant is trusted since the request was sent up to TP 100, however, independent verification of the new entrant's background interest may not be possible.

Similarly, a cascaded topology may be implemented as is illustrated in FIG. 4. The TP 100 communicates over a bidirectional link 105 with conference node 110. Here, bidirectional link refers to direction of communication and not to a particular manner of implementing such a link from the many that are known to one of ordinary skill in the art. Node 110 is connected to conference nodes 140 and 145 by bidirectional links 150 and 155 respectively. Furthermore, conference node 140 is connected by link 160 to conference node 165. Similarly, conference node 150 is connected by link 170 to conference node 175. Naturally, additional linkages are possible for more extensive topologies. It should be noted that the top provider 100 maintains control over the conference and a GCC 115 with its associated database of conference participants and applications is maintained.

Figure 5:
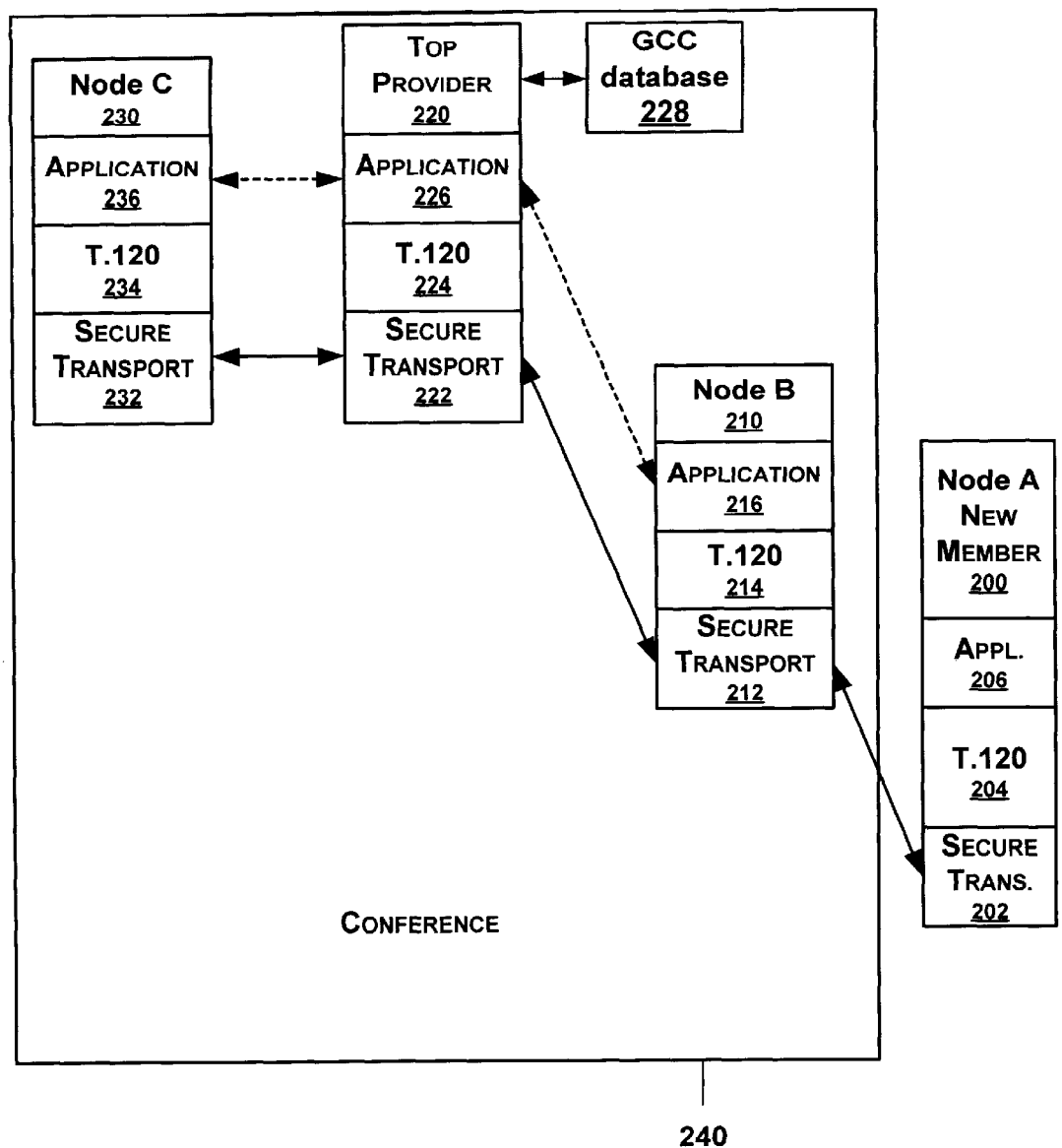
FIG. 5 illustrates a secure conference with centralized control.

In a secure conference, in accordance with the invention, FIG. 5 illustrates an embodiment permitting access to the identity of all members of a secure conference. FIG. 5 also illustrates the relative position of the stacks for managing different functions for each of the conference nodes where the data flow is from the bottom of the stack to the applications at the top. Specifically, a new potential trusted member, node A 200 has security transport processing software 202, T.120 protocol handling modules 204, and applications 206. The security processing software 202 establishes a secure connection with the trusted conference node 210. The trusted conference node 210, node own secure transport module 212, T.120 protocol handling modules 214 and applications 216. When an application at a node sends information to another node, it does not have to deal with the establishment of the secure channels, which is transparently performed by the lower layers. As a consequence upper applications layers do not encounter the certificates and negotiations undertaken in implementing secure connections.

Similarly, node B 210 is connected to the Top Provider (TP) 220, which, in turn, has a secure transport module 222, a T.120 module 224, application 226 and also manages a database as part of the Generic Conference Control (GCC) 228 feature of the T.120 specification. The logical connection, at the level of the applications of the TP 220 and node A 210, is shown by a broken bi-directional line although the underlying physical connections are not shown. An additional node C 230 is also shown with its secure transport 232, T.120 handling modules 234, and applications 236 to round off the description of the conference 240.

Figure 6:
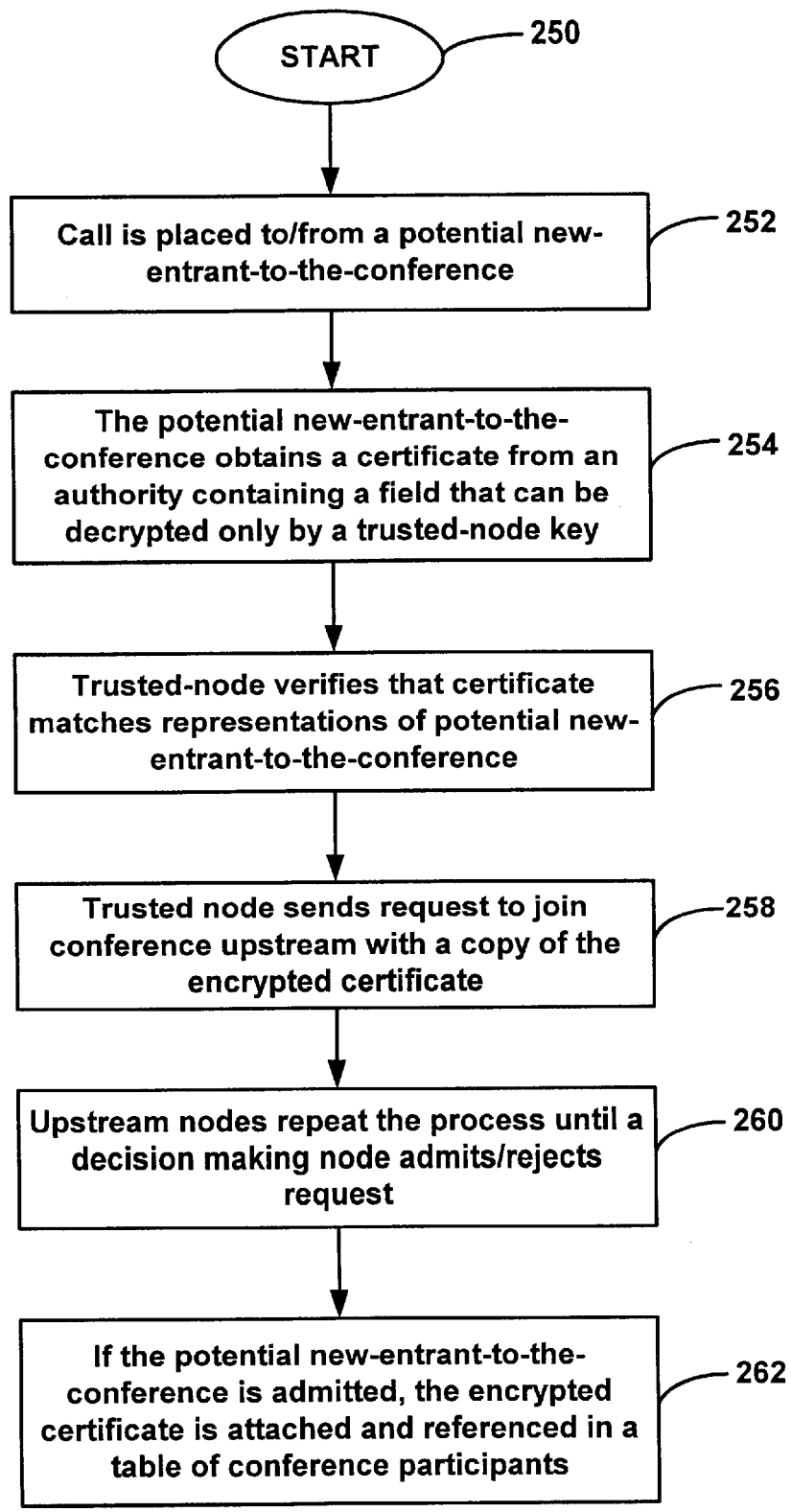
FIG. 6 illustrates a method for admitting a new node to a secure conference.

FIG. 6 illustrates the process for changing the membership of the conference 240 by adding a member. The procedure for adding a member to the conference starts at step 250 with a call being placed either to or from a potential new-entrant-to-the-conference at step 252. The call is between a node that is already part of the conference and the potential new-entrant-to-the-conference. Typically, the potential new-entrant-to-the-conference obtains a certificate containing encrypted information about the new-entrant-to-the-conference at step 254. Of course, in some instances the certificate may have to be obtained prior to step 252.

All nodes in the conference are considered to be trusted nodes. At step 256, the trusted node 210 communicating with the potential new-entrant-to-the-conference, node A 200, verifies that the certificate is authentic, which implies that the actual identity of the potential node A 200 is known with certainty. If the certificate is a forgery, in many embodiments trusted node 210 may not even learn of potential node A 200's desire to join the conference since the necessary secure link would not have been established by the lower layers. If the trusted node 210 has no objections to the potential new-entrant-to-the-conference, a request is sent upstream along with a copy of the certificate at step 258. In some embodiments, a certificate may be suitably re-encrypted while in other cases a certificate may be further verified by directly contacting the issuing trusted authority.

Higher application level layers exchange certificate information, in accordance with the invention, e.g., by using standard application level extensions to communicate the information to the applications layers at other nodes in the conference. This is enabled by the application layer at the negotiating trusted node 210 obtaining certificate information from the lower security and transport layers and then transmitting it to other nodes in the conference. This permits comparison, at the application layer, of the certificate information with the information exchanged at the lower levels in course of establishing secure linkages. In effect, each node is able to verify a new node's identity not only at the lower layers, i.e., through the automated software for establishing and maintaining linkages, but at the application layer, which is ordinarily oblivious to the processing below. Thus, a transitive security cloud is created at each node in the conference regardless of whether it is directly connected to the potential node A 200. The TP 220 and other nodes can rely on the improved security since they can directly determine the identity of the potential node A 200 and do not have to rely on the negotiating trusted node 210. This procedure also helps set up additional security since there is greater control over the conference membership and reduced likelihood of a Trojan node making the entire conference vulnerable, while addressing the difficulty of implementing independent direct three-phase key exchanges between the potential node 220 and each of the nodes in the conference.

In some embodiments, a node in the path of the request for joining the conference may be permitted to refuse to forward the request/certificate. The upstream nodes may never come to know of the, now, failed request. Such anticipated bottlenecks could be an asset in conferences where decisions on admitting new members are desirably made by more than one entity in the conference. In T.120 compliant conferences the certificate/request is passed upstream to the TP 220 of FIG. 5, as is illustrated in step 260. In other conferencing setups a decision-making node would handle the request.

Thus, a top provider would have the last word in a T.120 compliant conference, and upon allowing the potential new-entrant-to-the-conference 200 to join the conference based on not just the judgment of node 210, but direct verification of the identity of potential node 200, TP would update the database of conference participants at step 262, preferably implemented as a table, although other data structures are possible. In addition, the TP would either place the certificate or a reference to the certificate in the database. This enables nodes that may not be in the path of the request/certificate, or any node in the conference that has access to the table to ascertain the true identity and properties of the new addition to the conference.

In many instances, e.g. if the new addition is a competitor of an existing conference participant, due to risk of revelation of trade secret or other concerns, an existing conference participant may elect to quit the conference. In some embodiments, it may be possible to quit the conference prior to the new addition to the conference even learning of the presence/participation of the exiting conference node. In a T.120 compliant conference the exit of a node from the conference results in the database of conference participants being updated to delete entries corresponding to the exiting node.

Figure 7:
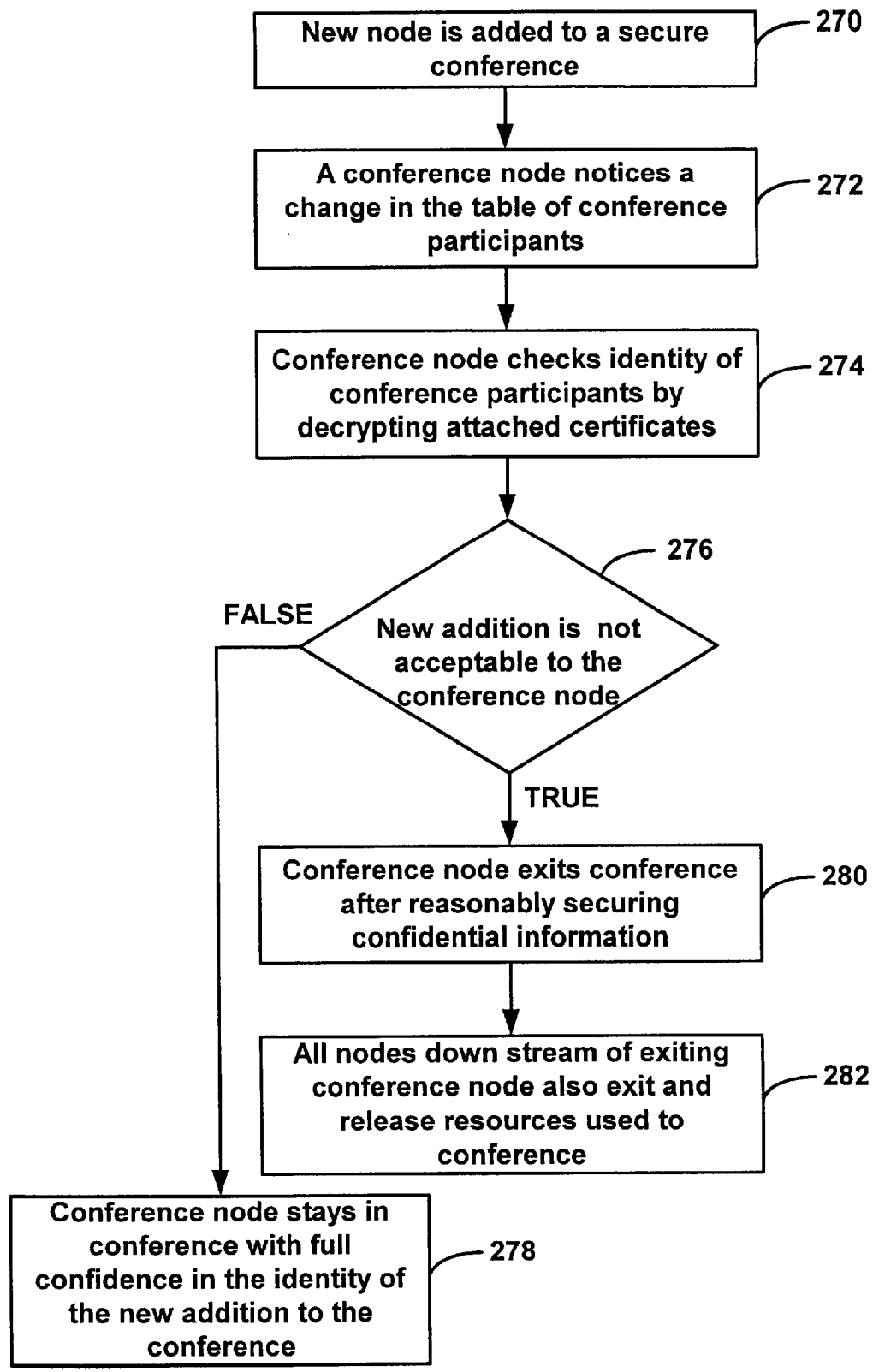
FIG. 7 illustrates a conference node exiting in response to an addition to the conference.

FIG. 7 illustrates a possible response to the addition of a new member to the conference. A new node is added to a secure conference at step 270. The presence of the new node is noted by a conference node, possibly by scanning the database maintained by the TP in a T.120 compliant conference at step 272. The conference node determines the identity of the new node by decrypting the certificate, or checking with the certificate issuing authority and the like at step 274. The conference node evaluates the impact of the presence of the new node on its own interests at step 276. If it has no objections to the presence of the new node in the conference, nothing needs to be done as is illustrated at step 278. However, in the event there cause for concern, at step 280, the conference node elects to exit the conference after securing confidential information to the extent possible. In a T.120 compliant conference all nodes downstream of the, now, exiting node have to exit as a consequence at step 282 and, preferably, associated resources devoted to the conferencing are released.

Figure 8:
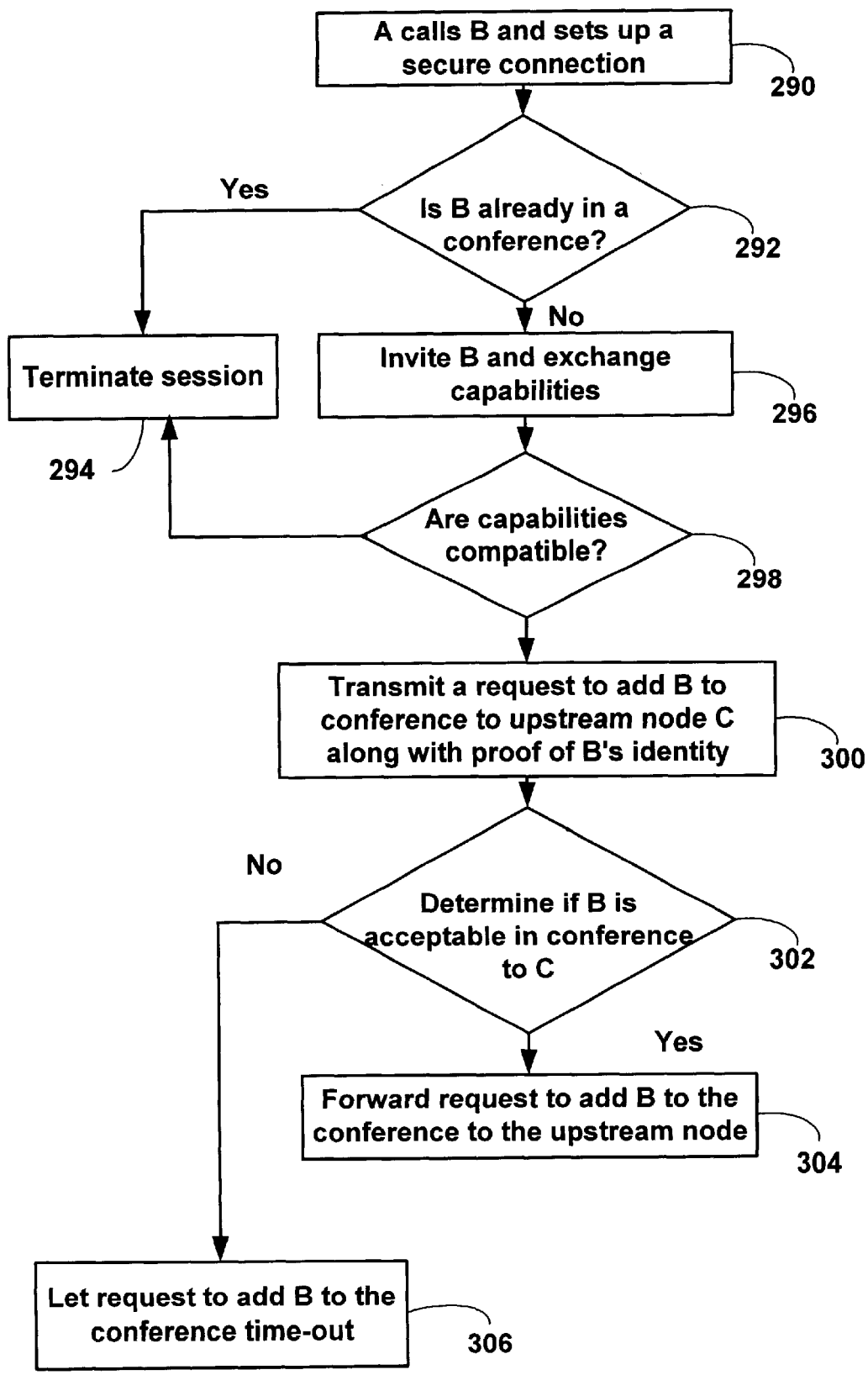
FIG. 8 illustrates a decentralized protocol being used to set up a conference connection for a centralized protocol.

FIG. 8 illustrates a general mechanism used to set up conferences. If a node A wishes to expand a secure conference, starting with a node B then A calls B and sets up a secure connection to verify B's identity and/or set up secure communications at step 290.

This ensures that all subsequent communications are hidden from unwelcome third parties. At step 292 A determines if B is already in a conference. In T.120 compliant conferences a node can be only in one conference. Thus, should B be in the conference the best A could do is to try to join the conference, but inviting B to A's conference would not be possible.

If B is in another conference then the session is terminated at step 294. At step 296, if B is not in a conference, A and B exchange capabilities. These may include details of the speeds at which communications can be supported, compression schemes, fonts, colors, graphic resolution and the like. If the capabilities are acceptable then, at step 298, a decision is made to transmit a request to add B to A's conference at step 300. In a T.120 compliant conference, or a conference with centralized control, such a request would be transmitted upstream to a node C, which may be the TP for the conference. The upstream node C, then, makes the decision to admit B to the conference at step 302. If C has no objections to admitting B to the conference then either the request is forwarded or approved, as may be appropriate at step 304. On the other hand, if C has objections to B joining the conference then C may merely decline the request, or, equivalently allow it to time out at step 306. In effect, the description above provides a method for using a decentralized control to setup a connection for a centralized control. To the centralized control protocol it would appear as if the connection is directly to node B although there might be intervening proxies, routers and gateways that may have been used in setting up the connection to node B. The centralized protocol sees a functional direct address for B with the remaining information hidden from its view.

It is to be noted that the description provided is more general than the T.120 or the H.323 standards since the method taught here is relevant to conferences with centralized control or piece-wise decentralized control. T.120 and H.323 merely happen to be familiar exemplary protocols that help illustrate the method.

Figure 9:
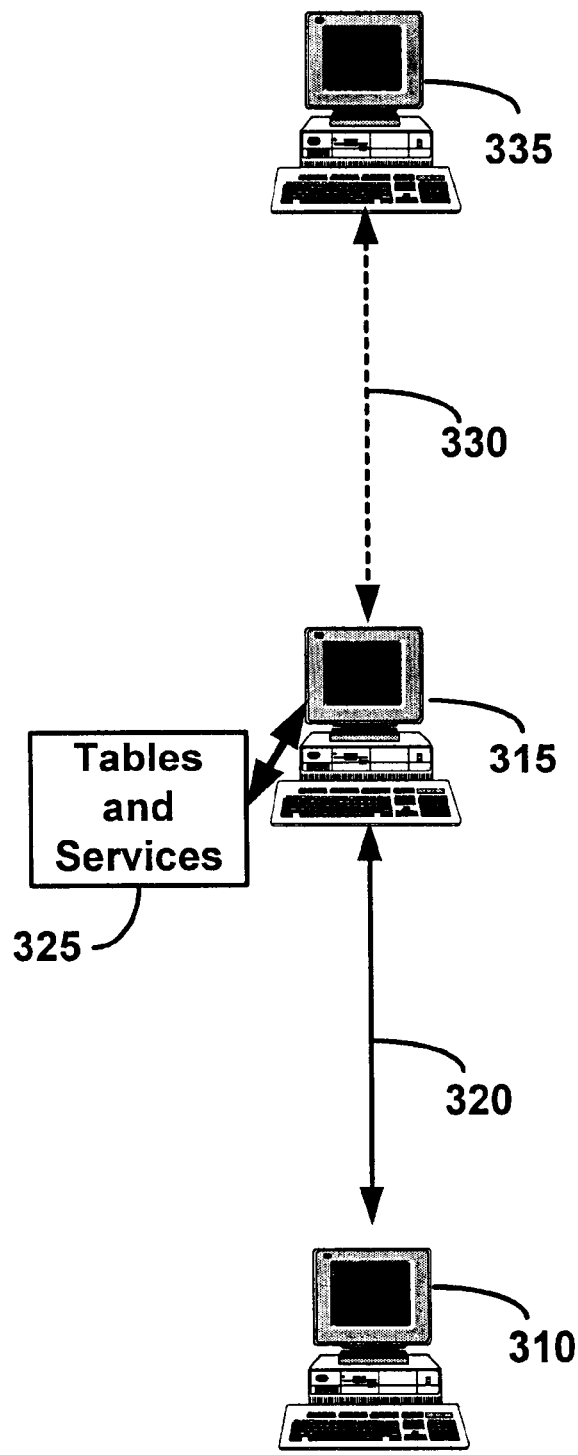
FIG. 9 illustrates a connection to a distant computer spanning unknown intermediaries.

In addition to these schemes for addressing and managing conference topologies in a manner approximating T.120 compliant conferences, it is of interest to permit alternative addressing schemes in setting up and managing conferences. It is difficult for most users to maintain precise addresses for potential conference participants. To this end, it is useful to use directory services that may determine the actual address of a node. This is even more important in case of nodes that have dynamic addresses that may change from session to session. FIG. 9 illustrates a scheme in which a computer 310 places a call to an intermediate computer 315 via a path 320. The intermediate computer 315 maintains tables and services 325 for determining a current address and path 330 to the actual target computer 335.

Thus, the computer 315 may only need to provide an email address, or even a combination of a name and address and the like and the intermediate computer handles the job of actual path determination transparently. There may be additional computers between the intermediate computer 315 and the target machine 335. Many of these computers may pass packets through as requested and function as routers. While others may act as proxies, viz., actually intercept the packets and appear to be computer 335 although, in reality, the actual address of computer 335 is never revealed. This latter scenario is likely to be played out in the context of firewall where a number of computers may appear from the outside to have a single or a few IP addresses while actual addressing is hidden.

Figure 10:
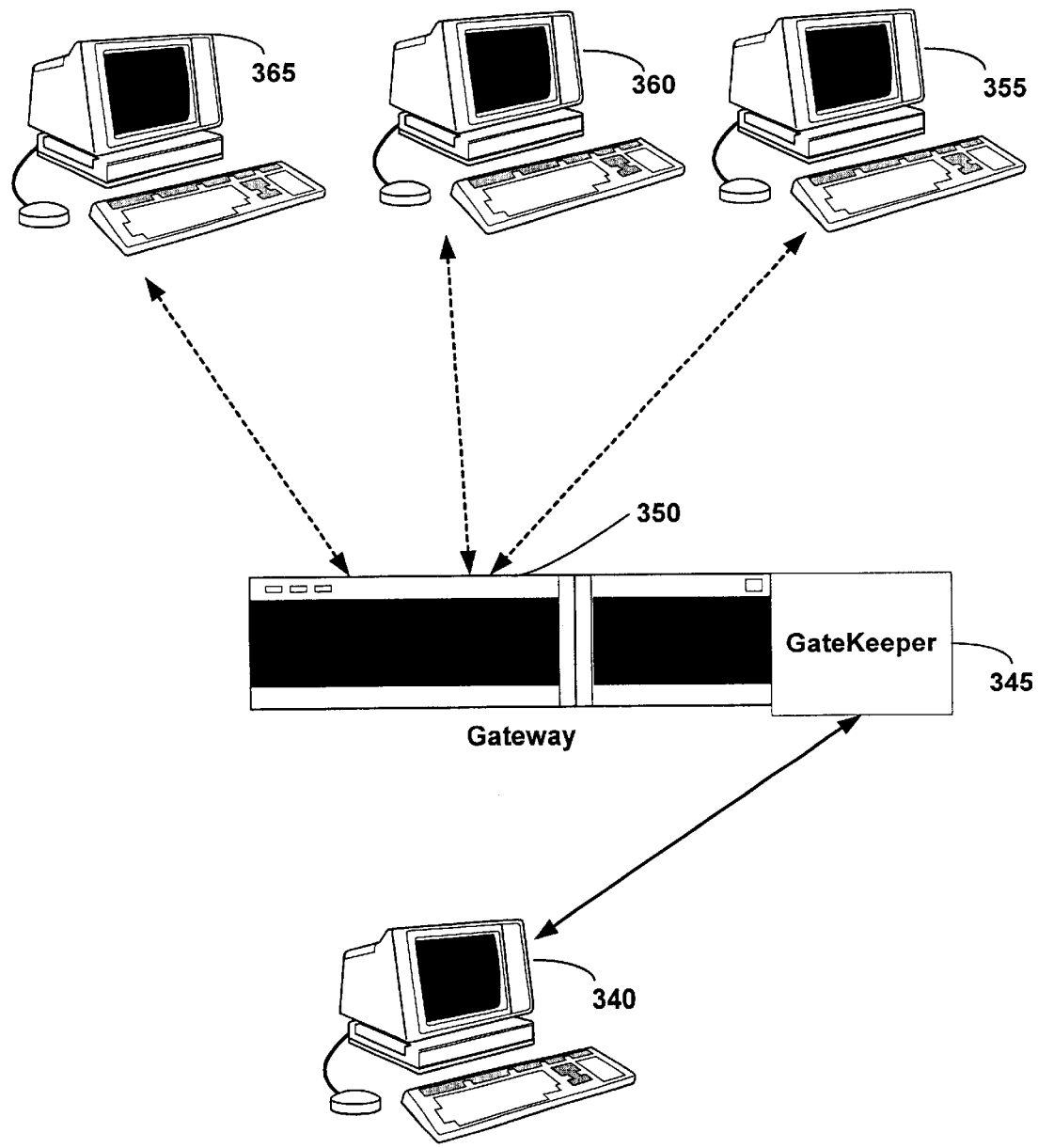
FIG. 10 illustrates exemplary connections using a gatekeeper and gateway.

FIG. 10 illustrates a scenario, similar to the description above that is in accord with the H.323 standards. Computer 340 registers and communicates with a Gatekeeper 345, which functions like a directory look up service and grants permission to computer 340 to access other addresses. The actual addressing is done by a Gateway 350, regulated by the Gatekeeper 345. The Gateway 350 also makes it possible to connect to a variety of targets, e.g., a Public Switched Telephone Network (PSTN) to make a phone call, by suitably converting the data packets. Currently, few H.323 compliant Gatekeepers and Gateways are available in networks accessible to the public at large although the market for Gateways and Gatekeepers is likely to develop and mature rapidly support for the H.323 standard, e.g., in "NETMEETING" brand products, versions 3.0, manufactured by "MICROSOFT" Corporation of Redmond Wash. Here, the Gateway 345 communicates with other computers 355, 360 and 365 and routes data packets as requested. In other embodiments, it may be possible to dispense with the Gatekeeper and use the Gateway directly, but without the services provided by the Gatekeeper.

A preferred embodiment of the invention uses the TCP/IP protocol for addressing data packets. The TCP/IP suite provides for delivery of data-packets with either error correcting delivery under TCP protocols or by a "best attempt" strategy under UDP. In an embodiment of the invention, data corresponding to applications and sensitive communications is sent via the TCP protocol while more error tolerant data streams such as those from audio and video use UDP to avoid the extra overhead of TCP. In other embodiments, only TCP may be used, particularly when the audio and video data is encrypted.

An embodiment of the invention makes it possible to setup conference topologies in conformity with the T.120 standards, while using the H.323 protocols to establish the connections. This permits setting up H.323 compliant conferences, which can exchange data, audio and video and adopt a variety of topologies to suit potential conference participants while retaining interoperability. Upon initiation of an H.323 compliant call, a gatekeeper may be used, or alternatively other directory lookup services may be utilized to establish a connection with a node of interest. After the basic formalities are completed, the target node is queried to determine if it is in a T.120 conference and potential port numbers are obtained for TCP connections. Additional port numbers may be obtained for setting up UDP connections for audio or video. The address and port numbers of the target node, obtained in course of the H.323 negotiations, are then used to setup/or update a T.120 session. This is possible because the intermediate computers that may be acting as proxies, in the case of a firewall for instance, or routers or gateways are effectively transparent to the T.120 connection, thus simulating a direct connection. Furthermore, since H.323 management does not require a top provider to be defined, it is possible to connect several H.323 conferences into one T.120 session with a defined top provider.

Advantageously, each of the H.323 conferences can be modified by adding software modules to provide for tearing down the connections in the event the top provider or another upstream node, in the sense of T.120 specifications, quits. Some embodiments allow for establishing secure connections so that data is encrypted, and possibly decrypted/encrypted several times in course of traversing the combination of H.323 compliant conferences that also simulate a T.120 conference for data exchanges.

Figure 11:
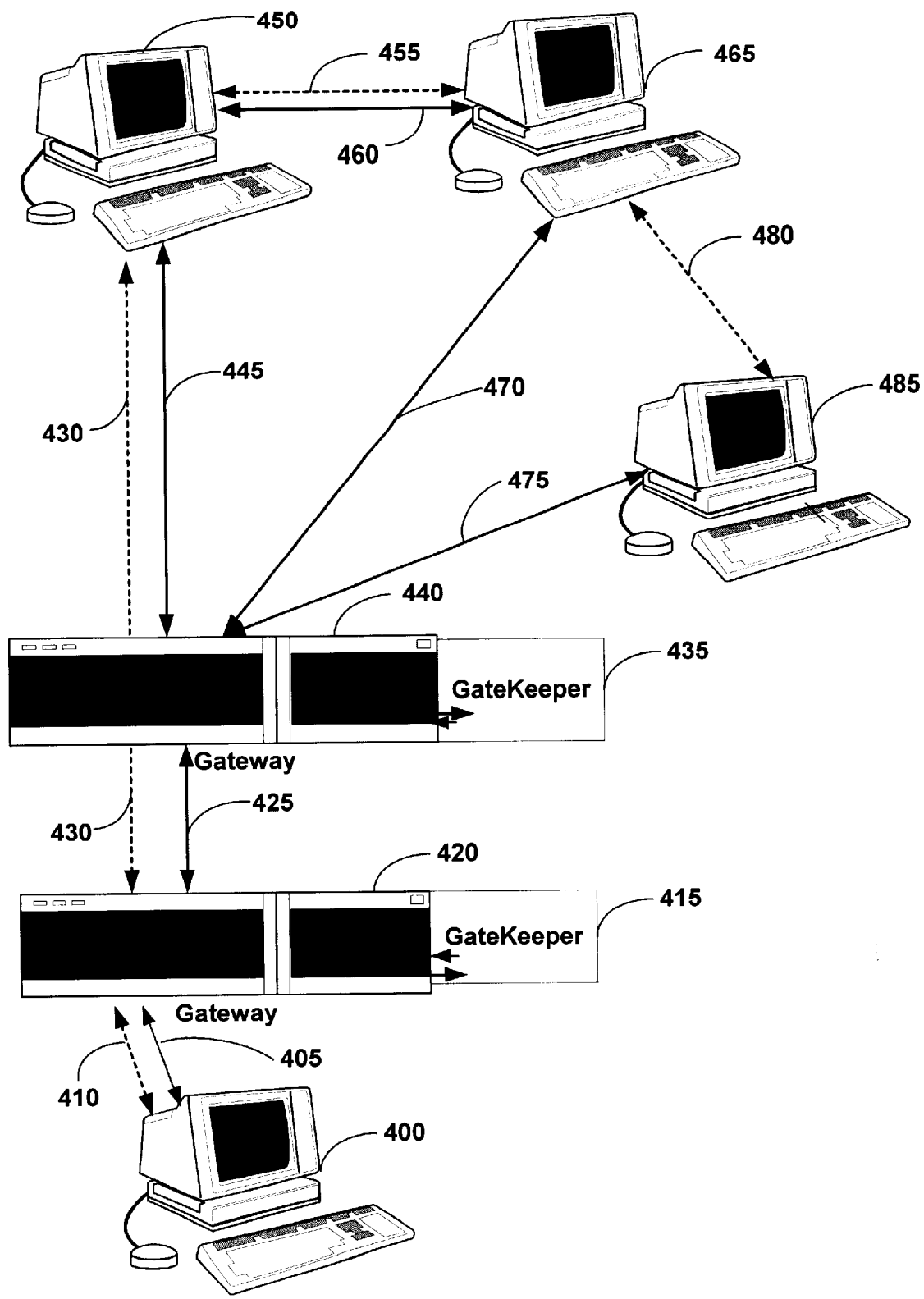
FIG. 11 illustrates logical and physical connections using gatekeepers and gateways.

Some embodiments may further extend the use of Gateways by utilizing the ability of Gateways to handle more than one set of connections. Such Gateways preferably utilize encapsulation, e.g. by launching separate processes or restricting memory space, access to data and the like, to isolate processing pertinent to one conference connection from another conference connections. In effect such a Gateway, particularly when functioning as a proxy, may facilitate and participate in more than one T.120 compliant conference, or in more than one leg of a T.120 compliant conference, thus making the T.120 and H.323 standards more useful and flexible. FIG. 11 illustrates such an arrangement.

A computer 400 is connected by a physical connection 405 and a logical connection 410 to a Gatekeeper 415 and a Gateway 420 controlled by the Gatekeeper 415. The Gateway 420, under control of the Gatekeeper 415 establishes a connection 425 with another Gateway 440, controlled by a Gatekeeper 435, to set up physical connection 445 in order to complete the logical connection 430 to computer 450. T.120 compliant software can only view the target 450 via the logical connection 430, while the H.323 compliant software is able to negotiate with the intervening Gatekeepers 415 and 435 in course of setting up the logical connection 430. Thus, in effect, the Gateway 420 may appear to T.120 compliant software to be the computer 450, and hence Gateway 420 may function like a proxy for computer 450 in some embodiments.

Additions to the conference are made as described earlier to set up the logical connection 455 and the physical connection 460 in order to add computer 465 to the conference. Computer 465 sets up the physical connections 470 and 475 via Gateway 440 in order to set up the logical connection 480 to the computer 485. All of the connections are set in accordance with the previously described procedures.

Figure 12:
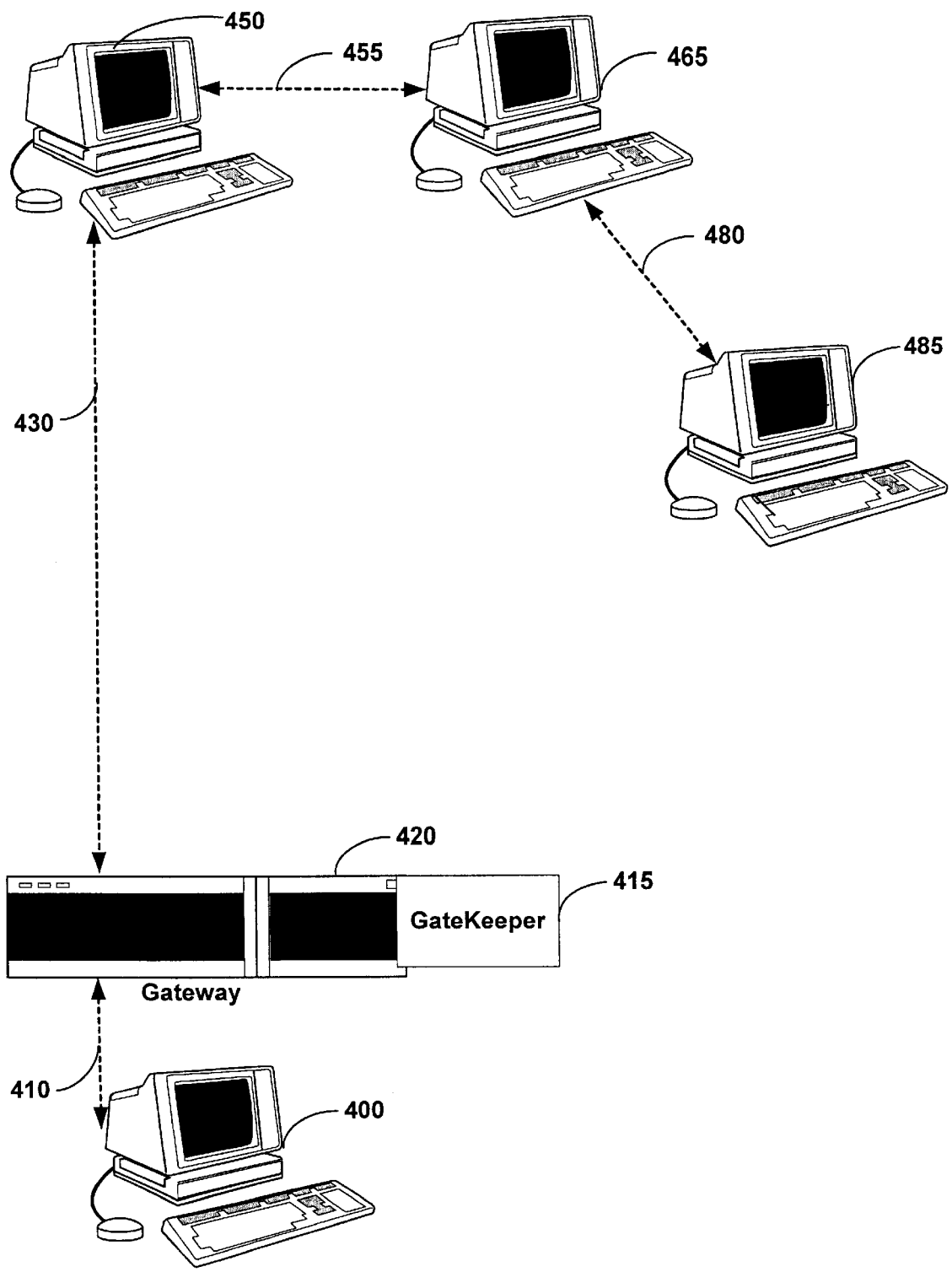
FIG. 12 illustrates the logical connections without the physical connections.

Logically, the conference appears to be a daisy chain topology as is illustrated in FIG. 12. These connections reflect the history of the conference expansion as seen by the T.120 compliant modules. The physical connections set using the H.323 compliant procedures and the H.323 conferences have been overlayed by a T.120 topology and control. Deleting the node at computer 450 would trigger routines to release resources and connections used by nodes 465 and 485. It should be noted that physically it is possible for computers 465 and 485 to stay in the conference as long as the gateway 420 and gatekeeper 415 are available. Some embodiments of the invention could require that the H.323 compliant conferences also be torn down. Furthermore, in other embodiments, the TCP connections may be advantageously restricted to transmitting secure encrypted data while some of the H.323 conferences may handle, audio and video connections. E.g., computers 400 and computers 450 may exchange audio and video using UDP and data using TCP provided that the UDP and TCP connections are both available. If the T.120 connection is lost then this could be flagged by the breaking of the TCP connection which may be used to tear down the UDP connections, i.e., H.323 audio/video links as well, thus cementing the impression of an integrated conference.

Figure 13:
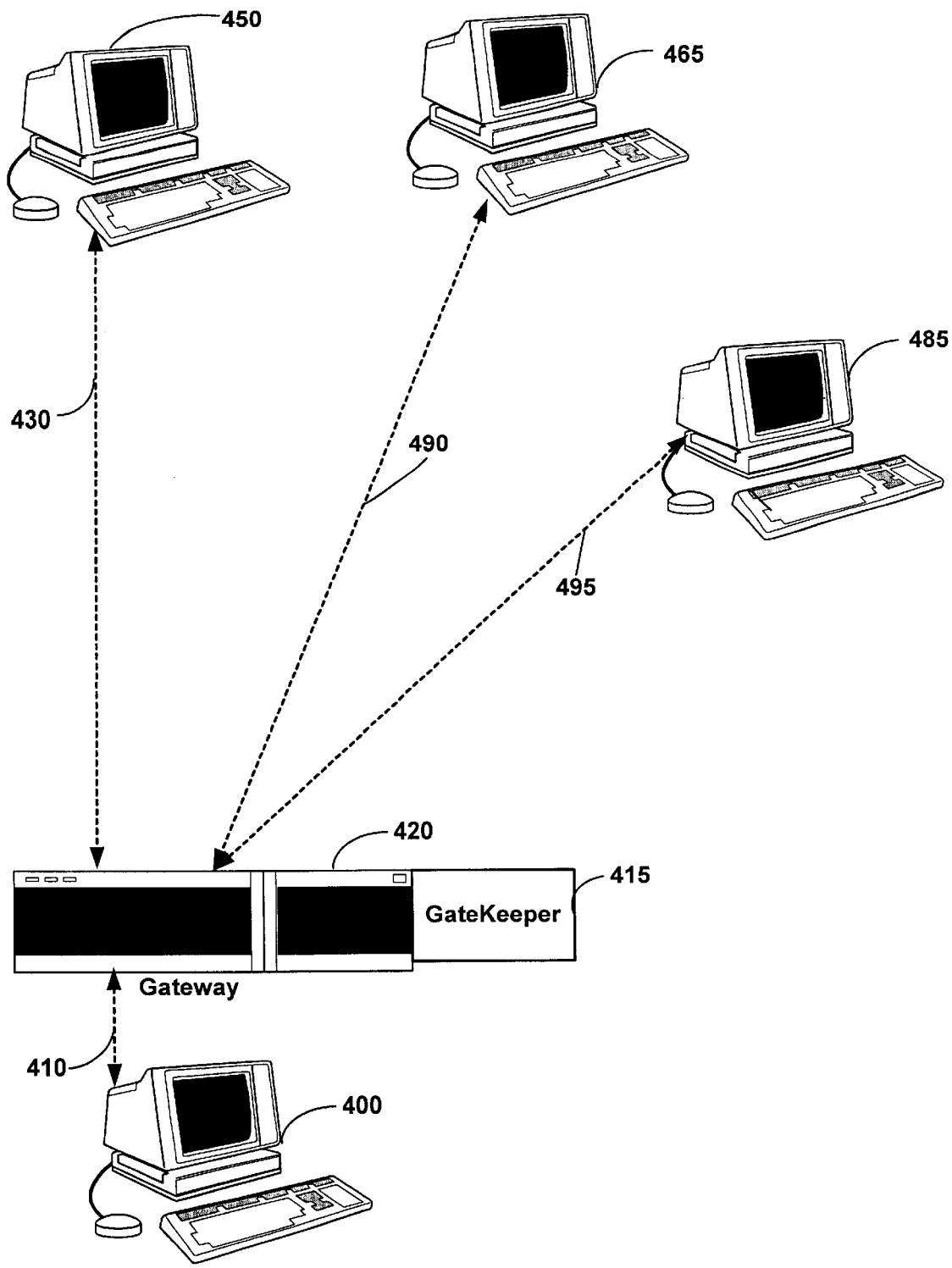
FIG. 13 illustrates different logical connections corresponding to similar physical connections.

FIG. 13 illustrates the same physical connections as in the conference depicted in FIG. 11, but with the logical connections corresponding to a star topology. Here, the logical connection 490 is established between computer 465 and the gateway 420. Similarly, the logical connection 495 is established between computer 485 and the gateway 420. This is made possible by direct negotiations by the computer 400 to add node 465 and computer 485 to the conference, naturally mediated by the gatekeeper 415. Naturally, the physical connections are not setup in the order for the daisy chain topology. Now, if computer 450 leaves the conference, there would be no need to tear down the connections to computers 465 and 485 because the logical connections are different although physical connections are similar to those illustrated in FIG. 11.

The address location and gateway control functions of the gatekeepers allow further variations on the conference topologies that have utility in reducing network traffic and/or better topologies. Furthermore, smart Gatekeepers can be used to establish dynamic physical/logical networks to, for instance, minimize time delays or reduce congestion.

Figure 14:
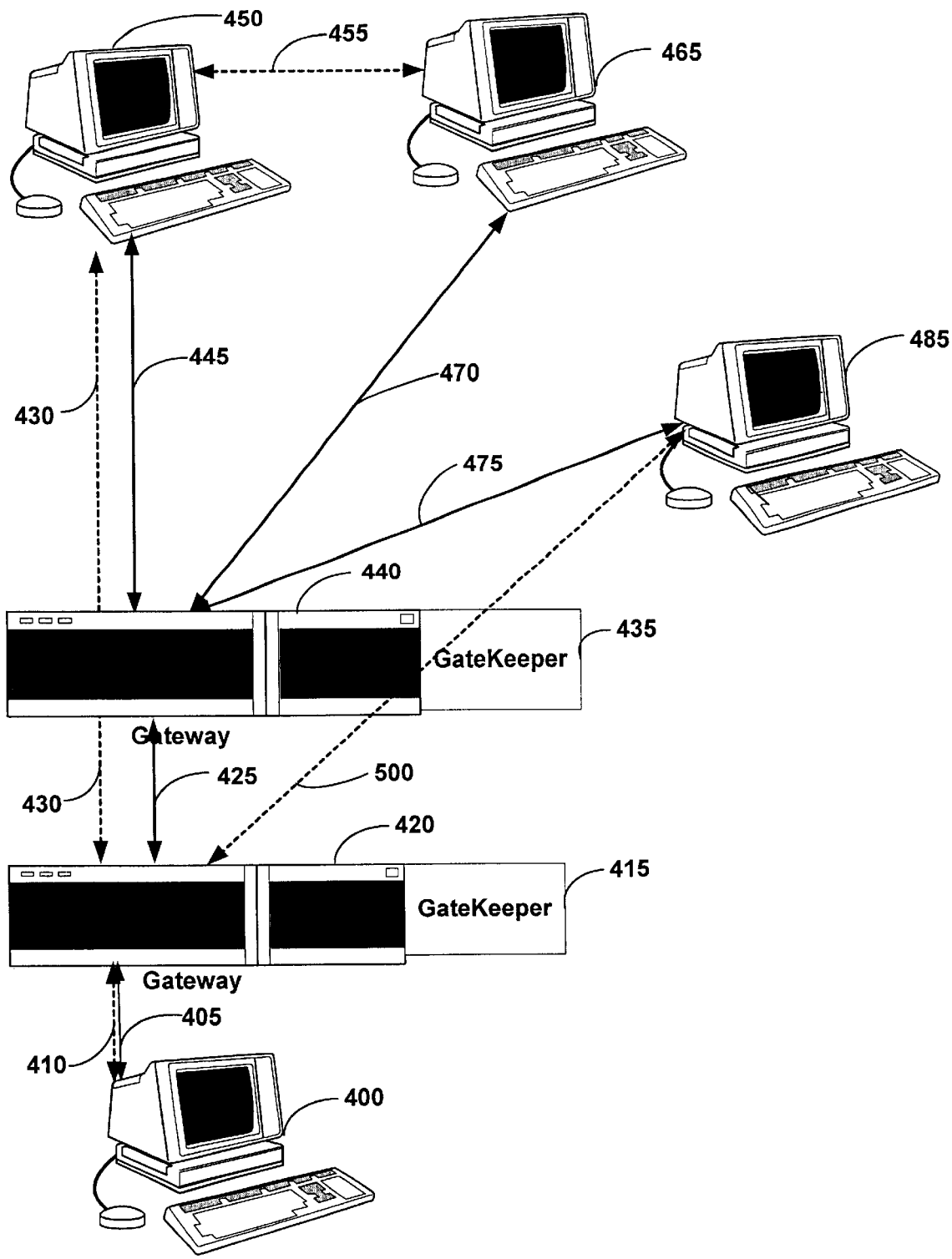
FIG. 14 illustrates readjustment of physical connections, corresponding to a given set of logical connections, by a smart gatekeeper to reduce network traffic.

FIG. 14 illustrates a conference where Gatekeeper 435 has setup physical connections 470 and 475 to implement logical connections 455 and 500 respectively. Although computer 465 was admitted to the conference via negotiations with computer 450, data packets from computer 400 to computer 465 use physical connection 470 due to the ability of a 'smart' gatekeeper 435 to detect the shortest path. In the absence of a 'smart' gatekeeper 435, data-packets from computer 400 would be routed to gateway 440 and then to computer 450 and then to gatekeeper 440 again, then onwards to computer 465. Thus, smart gatekeepers taught by this embodiment would be able to detect computers participating in a conference, and thus optimize the tables used to direct data-packets between conference participants. It should be noted that this function is desirable in the context of a conference where considerable packet traffic of a particular type is to be expected. Non-conference traffic need not be handled similarly. Furthermore, for maintaining secure connections gatekeepers may advantageously encapsulate the conference related processing along with the process for managing each conference participant. Thus, for the purpose of T.120 connections a gatekeeper or a gateway is not violating the standard by participating in more than one conference since the multiple roles played by the same physical gateway or gatekeeper are distinct logical roles. Furthermore, preferably, dedicated routines manage the lookup tables thus keeping the 'smart' routing transparent to the conference implementing software.

This arrangement reduces network traffic, but does not change the conference topology. If node 450 were to quit the conference, the connection to node 465 would be torn down as well in a T.120 compliant model. And the physical implementation is hidden from the T.120 modules since logical addresses are mapped into physical addresses by the Gatekeepers transparently.

Smart gatekeepers may recognize that certain connections belong to the same conference by examining the negotiations at the H.323 level and recording the topology. Alternatively, packets passed on by a Gateway may be tagged and if the same packet is encountered again then the later address may be used in an updated address table to reduce unnecessary loops and circuitous routes formed due to the manner in which the conference was built up. A more direct method may be to implement a conference handling software module on a gatekeeper that may assign an identifier to a conference and track participants in the same conference, preferably only for the purpose of optimizing the network traffic. Such optimizations not only release bandwidth for other productive uses, but also reduce delays in signal transmission. Thus, the result of practicing this invention is a more acceptable and realistic user friendly conferencing experience that ensures privacy and convenience.

Due to the prevalence of attempted unauthorized access to computer networks and databases, it is no longer unusual to encounter firewalls to ward off unwelcome cyber-visitors. Firewalls can be divided into two major classes. First there are firewalls that allow packets in to only selected set of addresses. Other firewalls actually examine the packets to determine whether they should be permitted to enter the protected area. In many implementations, incoming traffic has to be addressed to a single address followed by subsequent sorting by the firewall software. Furthermore, many firewalls are implemented via gateways and gatekeepers or similar entities. A firewall may be thought of, in some instances, as a smart gatekeeper requiring authentication prior to allowing a connection to be setup. Additionally, there may be one or more encryption/decryption steps required. Thus, the ability to address and setup communication links spanning gateways and gatekeepers allows even a T.120 compliant conference to be setup when a firewall permits inbound connections.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

We claim:

1. A method for accepting a new node to join a secured conference controlled by a top provider, comprising:

transmitting, by the new node to a first node, a request to join the conference and a certificate specifying an identity of the new node, said first node being connected to the top provider and participating in the conference, said new node being not directly connected to the top provider for transport-layer authentication;

authenticating, by the first node, the new node on a transport level;

forming, by the first node, a secured link with the new node if the new node is successfully authenticated on the transport level;

transmitting, by the first node on an application level, the request and certification of the new node to an application layer of the top provider over a secured link formed between the top provider and the first node;

verifying, by the top provider on an application level, the identity of the new node based on the certificate of the new node; and informing, by the top provider, a second node connected to the top provider and already participating in the conference that the new node is to join the conference, and making the certificate of the new node available to the second node.

2. A method as in claim 1, further including the step of indicating by the second node to the top provider that the new node should be denied admission to the conference.

3. A method as in claim 1, further including the step of determining by the first node whether to transmit the request of the new node to the top provider after the new node is authenticated by the first node on the transport level.

4. A method as in claim 1, further including the step of providing a shared key to the new node for data encryption during the conference.

5. A method as in claim 1, wherein the step of informing includes updating a list of conference participants to include the new node as a conference participant, said list of conference participants being accessible to the second node.

6. A method as in claim 1, wherein the step of making available includes placing the certificate of the new node in a database of the top provider accessible by the second node.

7. A method as in claim 1, wherein the step of making available includes placing a reference to the certificate of the new node in a database of the top provider accessible by the second node.

8. A method as in claim 7, wherein the step of verifying includes determining by the top provider whether to allow the new node to join the conference.

9. A method as in claim 1, further including the step of verifying by the second node the identity of the new node based on the certificate of the new node made available by the top provider.

10. A method as in claim 9, further including the step of determining by the second node whether to leave the conference based on the identify of the new node.

11. A computer-readable medium having computer-executable instructions for performing steps for accepting a new node to join a secured conference controlled by a top provider, comprising:

transmitting, by the new node to a first node, a request to join the conference and a certificate specifying an identity of the new node, said first node being connected to the top provider and participating in the conference, said new node being not directly connected to the top provider for transport-layer authentication;

authenticating, by the first node, the new node on a transport level;

forming, by the first node, a secured link with the new node if the new node is successfully authenticated on the transport level;

transmitting, by the first node on an application level, the request and certification of the new node to an application layer of the top provider over a secured link formed between the top provider and the first node;

verifying, by the top provider on an application level, the identity of the new node based on the certificate of the new node; and informing, by the top provider, a second node connected to the top provider and already participating in the conference that the new node is to join the conference and making the certificate of the new node available to the second node.

12. A computer readable medium as in claim 11, including further computer-executable instructions for the second node to perform the step of indicating to the top provider that the new node should be denied admission to the conference.

13. A computer-readable medium as in claim 11, further including computer-executable instructions for the first node to perform the step of determining whether to transmit the request of the new node to the top provider after the new node is authenticated by the first node on the transport level.

14. A computer-readable medium as in claim 11, further including computer-executable instructions for performing the step of providing a shared key to the new node for data encryption during the conference.

15. A computer readable medium as in claim 11, wherein the step of informing includes updating a list of conference participants to include the new node as a conference participant, said list of conference participants being accessible to the second node.

16. A computer readable medium as in claim 11, wherein the step of making available includes placing the certificate of the new node in a database of the top provider accessible by the second node.

17. A computer readable medium as in claim 11, wherein the step of making available includes placing a reference to the certificate of the new node in a database of the top provider accessible by the second node.

18. A computer readable medium as in claim 17, wherein the step of verifying includes determining by the top provider whether to allow the new node to join the conference.

19. A computer readable medium as in claim 11, including further computer-executable instructions for the second node to perform the step of verifying the identity of the new node based on the certificate of the new node made available by the top provider.

20. A computer readable medium as in claim 19, including further computer-executable instructions for the second node to perform the step of determining whether to leave the conference based on the identify of the new node.

21. A computer-readable medium having computer-executable instructions for performing steps by a first node participating in a secured conference controlled by a top provider for accepting a new node to join the secured conference, comprising:

receiving from the new node a request to join the conference and a certificate specifying an identity of the new node, said new node being not directly connected to the top provider for transport-level authentication;

authenticating the new node on a transport level;

forming a secured link with the new node if the new node is successfully authenticated on the transport level;

transmitting, on an application level, the request and certification of the new node to the top provider over a secured link formed between the top provider and the first node; and receiving a response on an application level from the top provider to permit the new node to join the secured conference.

22. A computer-readable medium as in claim 21, further including computer-executable instructions for the first node to perform the step of determining whether to transmit the request of the new node to the top provider after the new node is authenticated by the first node on the transport level.

23. A computer-readable medium as in claim 21, including further computer-executable instructions for the first node to perform the step of providing a shared key to the new node for data encryption during the conference.

* * * * *